Patented Mar. 16, 1954

2,672,427

UNITED STATES PATENT OFFICE 2,672,427

PROCESS FOR RENDERING FILMS AND THE LIKE WATER-REPELLENT, GREASEPROOF, AND MOISTUREPROOF

Adrianus L. Bauling, Deventer, Netherlands, and David T. Milne, Fredericksburg, Va., assignors to American Viscose Corporation, Wilmington, Del., a corporation of Delaware No Drawing. Application May 26, 1951, Serial No. 228,532

19 Claims. (Cl. 117—140)

This invention relates to a process for rendering films, fabrics, and other sheet materials, water-repellent, greaseproof and moistureproof. More particularly, the invention relates to a process of coating or impregnating sheet materials with an aqueous emulsion thus eliminating the use of volatile organic solvents and the difficulties and disadvantages attendant thereto.

The coating or impregnating process of the present invention is applicable to the treatment of all types of films and fabrics, and the like, whether they be fibrous or non-fibrous, pervious or impervious, for example, cellulosic films formed from viscose, cuprammonium cellulose, cellulose ethers and esters, such as methyl cellulose, ethyl cellulose, hydroxyethyl cellulose, etc., cellulose acetate, nitrocellulose, etc., resinous materials, such as vinyl acetate, vinyl chloride, copolymers of vinyl acetate and vinyl chloride, saran, polyethylene, etc., paper, fiberboard, cardboard, strawboard, felt-like products and textile fabrics formed from cotton, wool, flax, hemp, rayon, nylon, etc. For purposes of illustration, however, the invention will be described as it is applicable to the treatment of cellophane or regenerated cellulose film, it being understood, of course, that this is not intended in a limitative sense.

The usual method for rendering films, fabrics, and the like, water-repellent, moistureproof, and/or greaseproof is to coat or impregnate the same with a lacquer or a volatile organic solvent solution of a composition comprising a film former, wax, and/or plasticizers, blending agents, oils, hardening agents, etc. The use of the organic solvents has several disadvantages, chief among which are the high cost of the solvents, the fire hazards attendant their handling and use, and most important of all, the necessity of installing a suitable recovery system for recovering the solvents which is necessary because of their high cost.

It is an object of the present invention to provide a process for rendering films, fabrics, and the like, water-repellent, moistureproof, and/or greaseproof by coating or impregnating the same with an aqueous emulsion thus eliminating the use of organic solvents.

It is another and specific object of the invention to provide a process for coating or impregnating films, fabrics, and the like, wherein there is employed an aqueous emulsion comprising a heat-hardening or thermosetting resin, a moistureproofing agent and a water-soluble cellulose ether which is capable of being rendered water-insoluble.

Other objects and advantages of the present invention will be obvious from the description thereof hereinafter.

The process according to the invention comprises in general the application to one or both surfaces of a film, fabric, or the like, of a thin layer of an aqueous emulsion comprising a heat-hardening or thermosetting resin, such as melamine or ureaformaldehyde, and the like, a water-soluble salt of carboxyalkyl cellulose ethers which are capable of forming water-insoluble metal salts, and a moistureproofing agent, such as wax, paraffin, etc. The thin layer is then treated with an aqueous solution of a metal salt with which the carboxyalkylcellulose ethers form insoluble salts. After this treatment the film, fabric, etc. is washed and then dried for a time and at a temperature sufficient to harden or set the thermosetting resin in the coating.

The cellulose ether salts best suited for use in the present invention are the water-soluble alkali metal salts of carboxyalkyl cellulose ethers as a class, such as the sodium, potassium, lithium salts of carboxy-, methyl-, ethyl-, propyl-cellulose ethers. Suitable metal salts for rendering the above-mentioned cellulose ether salts insoluble are the water-soluble inorganic salts, such as those of lead, silver, tin, chromium, zinc, mercury, and the like, especially the water-soluble salts of a strong acid and a weak base. The amphoteric metal salts are particularly useful. When a blue color is not objectionable, salts of copper and nickel may be used; and when a red color is not objectionable, ferric salts may be employed. It is to be understood that the salt employed must be capable of insolubilizing the cellulose ether salt employed in the emulsion.

The water-soluble inorganic salts employed in the present invention serve a two-fold purpose. Not only do they insolubilize the water-soluble cellulose ether salts employed, but they also aid in the curing of the thermosetting resin, i. e. they have a catalytic effect thereon because they hydrolyze when subjected to heat.

It is not necessary that the water-soluble alkali metal salts of the carboxyalkyl cellulose ethers be in pure form, an unpurified product containing reaction and/or neutralization products, such as sodium chloride, sodium glycolate and sodium acetate, being satisfactory. Preferably, however, any carbonates should be avoided in order to alleviate the danger of forming pinholes in the coating due to the liberation of carbon dioxide gas from the carbonates.

As a moistureproofing agent, high-melting or microcrystalline paraffin is preferred since it is easily emulsifiable in an aqueous solution of a water-soluble cellulose ether salt. Any other wax may be employed which is emulsifiable in an aqueous solution of a water-soluble cellulose ether salt.

In case of the heat-hardening or thermosetting resin, there may be used an aqueous solution of the resin or an oil-in-water type of emulsion of the resin which may contain a small amount of an organic solvent, for example, an oil-in-water type of emulsion of a melamine-formaldehyde resin containing a small amount of butyl alcohol. While it is preferred to use a melamine-formaldehyde resin, other thermosetting resins may be employed, such as phenol-formaldehyde when a dark color is not undesirable, any of the aminoplast type, for example, urea-formaldehyde, and the like. Various plasticizers for the different resins may be incorporated in the resin emulsions, if desired. Preferably, a plasticizer should be employed to insure a flexible coating.

The coating and impregnating compositions of the present invention may be applied to films, fabrics, and the like, while they are dry or wet, especially in a wet-gel condition.

Any proportion of the cellulose ether salt may be employed short of a gel, the preferred concentration range being from 0.2 to 10.0%. The concentration of the ether salt is also dependent on the "viscosity" of the particular cellulose ether salt employed. The concentration of the thermosetting resin and paraffin may be varied as desired depending upon the moistureproofness qualities desired in the coated or impregnated product. Generally, however, the concentration of thermosetting resin and paraffin is proportional to the concentration of cellulose ether salt, the suitable proportion of resin to cellulose ether salt being in the range of approximately 1:1 to 20:1, and the suitable proportion of paraffin to cellulose ether salt being in the range of 1:1 to 20:1. Generally, when the proportions of thermosetting resin or paraffin to cellulose ether salt are reduced below the minimum given, the moistureproofness qualities of the coated or impregnated material is not satisfactory.

An emulsion of resin alone or an emulsion of cellulose ether salt and paraffin impart excellent water-repellent and greaseproof properties to films, fabrics, and the like, coated or impregnated therewith, but do not impart good moistureproof properties thereto, i. e. the ability of the coated or impregnated film to prevent the passage of moisture-vapor therethrough. It is only by using an emulsion containing paraffin, cellulose ether salt and a thermosetting resin that improved moistureproof properties, water-repellent properties and greaseproof properties are realized.

The following examples present illustrative embodiments of the invention.

*Example I*

To 100 parts of an emulsion of 10 parts of paraffin in 100 parts of a 2.25% aqueous solution of sodium carboxymethyl cellulose, there are added with mixing 100 parts of an oil-in-water emulsion of a plasticized melamine-formaldehyde resin, containing a small amount of butyl alcohol and with a solids content of 24%. This composition is applied to regenerated cellulose film by continuously passing the film through a bath containing the composition and removing the excess with wiper blades, and the like. Any of the other known and conventional means may be employed for applying the coating composition to the film surface, such as by contact with a coating roller, spraying, etc. The film is then treated, preferably by spraying, with a 10% solution of hydrated aluminum sulfate in water, the film is rinsed with water, dried, and then heated at 121° C. for three minutes to cure the resin. All of these steps take place continuously in consecutive order using conventional coating machinery.

The coated regenerated cellulose film is extremely water-repellent, greaseproof and has a moistureproof value on the order of 10. That is, one square meter of the coated film will allow 10 grams of water vapor to pass therethrough in 24 hours, at 20-30° C., when placed over 10% aqueous sodium chloride in a chamber containing concentrated sulfuric acid.

*Example II*

To 100 parts of a sodium carboxymethyl cellulose-paraffin emulsion, as described in Example I, there are added with mixing 8.5 parts of a resin emulsion as described in Example I. Regenerated cellulose film is coated with this composition and thereafter treated in the manner described in Example I. The coated film is very water-repellent and greaseproof and has a moistureproof value on the order of 35. Hydroxyethyl cellulose ether film and woven textile fabrics were coated in the same manner. The resultant film and fabric were water-repellent, greaseproof, and moistureproof.

*Example III*

To 20 parts of a sodium carboxymethyl cellulose-paraffin emulsion as described in Example I, there are added with mixing 60 parts of a 2.5% solution of sodium carboxymethyl cellulose in water and 7.3 parts of a resin emulsion as described in Example I. Regenerated cellulose film, when treated with this composition as in Example I, is very water-repellent and greaseproof and has a moistureproof valve on the order of 65.

When regenerated cellulose film is treated as described in Example I, with an emulsion containing a thermosetting resin, but no paraffin or cellulose ether salt, and thereafter dried and cured as described, a highly water-repellent and greaseproof film is obtained but the moistureproof value is only on the order of 160. Similarly, when regenerated cellulose film is treated as described in Example I with an emulsion containing paraffin and cellulose ether salt, but no resin, a highly water-repellent film is obtained but it has only a moistureproof value on the order of 300. In addition the coating tends to crack and lose its effectiveness if the film is creased or folded. Therefore, in order to produce water-repellent, greaseproof and moistureproof films, fabrics, and the like, by coating or impregnating with an aqueous emulsion, it is necessary that the emulsion comprise a cellulose ether salt, paraffin and a thermosetting resin.

Coatings of varying thickness may be obtained by varying the concentration of the cellulose ether in the emulsion. The temperature necessary to harden the resin will depend primarily upon the resin being used and also upon the length of time the coated or impregnated material is subjected to such temperature. Also, as the time of curing is varied, the curing temperature must be varied accordingly. However, generally a temperature in the range of 100 to 150° C. is satisfactory, the time of curing being generally inversely related to the temperature. In many instances, the drying and curing operations may take place simultaneously.

Various materials may be added to the emulsions of the present invention, if desired, such as dyes or pigments when colored films, fabrics, etc. are desired. Various additional plasticizers may be incorporated in the coating composition, but they are preferably added as an emulsion. Further, the plasticizer for the resin and/or coating may be chosen so that the treated film, etc. may be heat-sealing.

The unique feature of the present invention is the ability to produce films, fabrics, etc. which have the combined properties of being water-repellent, greaseproof, and moistureproof, and this by a simple coating operation with an aqueous emulsion, thus eliminating the use of costly and hazardous organic solvents. Numerous other advantages and features of the invention will be obvious to those skilled in the art.

It is to be understood that changes and variations may be made without departing from the spirit and scope of the invention as defined in the appended claims.

We claim:

1. A process for producing an article that is water-repellent, greaseproof and moistureproof comprising treating the article with an aqueous emulsion comprising a synthetic thermosetting resin selected from the group consisting of urea-formaldehyde, melamine-formaldehyde, and phenol-formaldehyde resins, paraffin, and at least 0.2 to 10% of a water-soluble, alkali metal salt of a carboxyalkyl cellulose ether, the ratio of said resin to said cellulose ether salt being from approximately 1:1 to 20:1 and the ratio of the paraffin to the cellulose ether salt being from 1:1 to 20:1, applying to the treated article a water-soluble inorganic salt of a metal with which the ether forms an insoluble salt, drying the treated article and then heating the treated article to cure the thermosetting resin.

2. A process as defined in claim 1 wherein the inorganic salt is formed from an amphoteric metal.

3. A process as defined in claim 1 wherein the treated article is heated at a temperature in the range of 100° to 150° C. to cure the thermosetting resin.

4. A process as defined in claim 1 wherein the thermosetting resin is a melamine-formaldehyde resin.

5. A process as defined in claim 1 wherein the thermosetting resin is a urea-formaldehyde resin.

6. A process as defined in claim 1 wherein the cellulose ether salt is water-soluble sodium carboxymethyl cellulose.

7. A process as defined in claim 1 wherein the water-soluble inorganic salt is aluminum sulfate.

8. A process as defined in claim 1 wherein the water-soluble inorganic salt is a 10% aqueous solution of aluminum sulfate.

9. A process for producing an article that is water-repellent, greaseproof and moistureproof comprising treating the article with an aqueous emulsion comprising a melamine-formaldehyde resin, paraffin and at least 0.2 to 10% of a water-soluble sodium carboxymethyl cellulose ether, the ratio of said resin to said cellulose ether salt being from approximately 1:1 to 20:1 and the ratio of the paraffin to the cellulose ether salt being from 1:1 to 20:1, applying to the treated article an aqueous solution of aluminum sulfate, rinsing the treated article with water, drying and then heating the treated article to cure the melamine-formaldehyde resin.

10. A process as defined in claim 9 wherein the article is a continuous film of regenerated cellulose.

11. A process as defined in claim 9 wherein the article is a continuous film of hydroxyethyl cellulose.

12. A process as defined in claim 9 wherein the article is a textile fabric.

13. A process as defined in claim 9 wherein the article is a felt-like sheet.

14. A process as defined in claim 9 wherein the article is a paper sheet.

15. As an article of manufacture, a sheet material and a single layer of a coating material carried on the sheet material, said layer comprising a mixture of a synthetic thermosetting resin in the heat-hardened condition, said resin being selected from the group consisting of urea-formaldehyde, melamine-formaldehyde, and phenol-formaldehyde resins, paraffin, and a water-insoluble metal salt of a carboxyalkyl cellulose ether, the ratio of said resin to said cellulose ether salt being from approximately 1:1 to 20:1 and the ratio of the paraffin to the cellulose ether salt being from approximately 1:1 to 20:1.

16. As an article of manufacture, a sheet material and a single layer of a coating material carried on the sheet material, said layer comprising a mixture of a melamine-formaldehyde resin in the heat-hardened condition, paraffin, and a water-insoluble aluminum salt of a carboxymethyl cellulose ether, the ratio of said resin to said cellulose ether salt being from approximately 1:1 to 20:1 and the ratio of the paraffin to the cellulose ether salt being from 1:1 to 20:1.

17. An article of manufacture as defined in claim 16 in which the sheet material is a non-fibrous pellicle of regenerated cellulose.

18. An article of manufacture as defined in claim 16 in which the sheet material is paper.

19. An article of manufacture as defined in claim 16 in which the sheet material is a textile fabric.

ADRIANUS L. BAULING.
DAVID T. MILNE.

References Cited in the file of this patent

UNITED STATES PATENTS

| Number | Name | Date |
| --- | --- | --- |
| 2,033,481 | Richter | Mar. 10, 1936 |

FOREIGN PATENTS

| Number | Country | Date |
| --- | --- | --- |
| 592,228 | Great Britain | Sept. 11, 1947 |